Patented Jan. 7, 1947

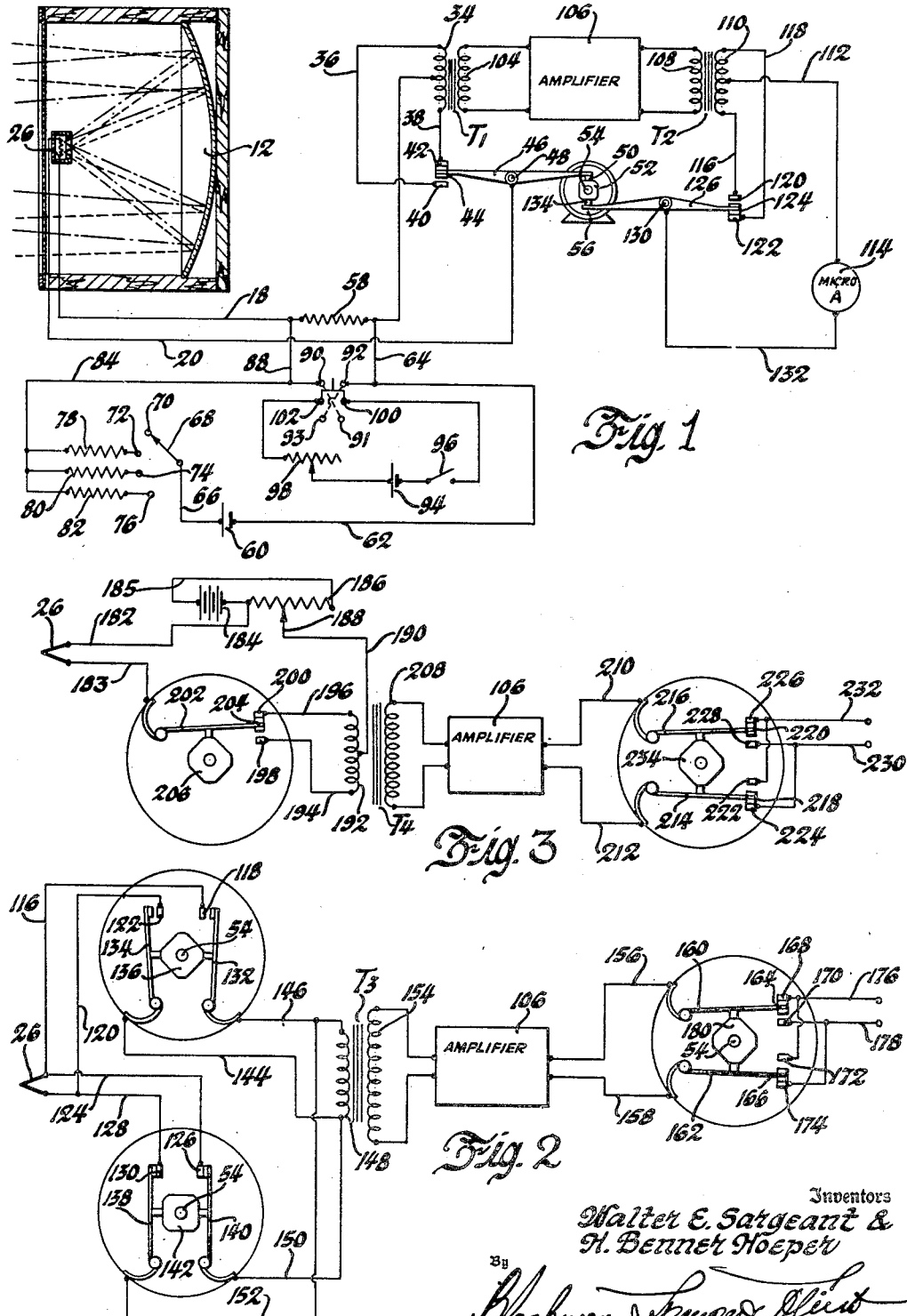

2,413,788

UNITED STATES PATENT OFFICE 2,413,788

AMPLIFIER FOR SMALL VOLTAGES

Walter E. Sargeant, Ferndale, and Herman Benner Hoeper, Detroit, Mich., assignors to General Motors Corporation, Detroit, Mich., a corporation of Delaware Application May 11, 1942, Serial No. 442,572

3 Claims. (Cl. 179—171)

This invention relates to amplifying means and more particularly to what is known as direct current amplifiers. There are many instances in which it is desirable or necessary to amplify small direct currents to higher or more useable values. This is, of course, a considerably more intricate problem than amplifying alternating currents which may be readily transformed. One instance, for example, in which means must be supplied to amplify direct currents in order to obtain a desired or useful sensitivity is in the output circuit of thermocouple detectors for the current involved is minute and must be amplified before indicating or control apparatus can be satisfactorily actuated thereby. Another example is in the measurement of properties of gases by measuring the conductance thereof or dielectric properties in which case the current is again small.

It is therefore an object of our invention to provide means for amplifying small direct currents so that they may be utilized for indicating or control purposes.

It is a further object of our invention to provide amplifying means to give synchronized, amplified currents of similar polarity at the input and output.

It is a still further object of our invention to provide amplifying apparatus which is simple of operation, rugged and may be easily portable so that it may be moved from place to place.

With these and other objects in view which will become apparent as the specification proceeds, our invention is best understood by reference to the following specification and claims and the illustrations in the accompanying drawing, in which:

Figure 1 is a schematic wiring diagram showing a system embodying our invention;

Figure 2 is a schematic wiring diagram showing a modified form of our invention; and Figure 3 is a still further modification of a variation in the circuit connections.

Referring now more specifically to Figure 1, there is shown therein the two connecting wires 18 and 20 which lead from desired pick-up means which may be, for example, two thermocouples 26 which are connected in series and line 18 extends to the resistor 58 and then to the center tap on the primary 34 of a transformer T₁. The two outer points of said primary are connected by lines 36 and 38 to stationary contacts 40 and 42, respectively, between which oscillates a movable contact member 44 which is connected on a pivoted lever 46. Line 20 on the other hand is connected directly to said pivoted or swingable lever 46. Lever 46 is pivoted at point 48 and has its opposite end provided with a pin 50 which cooperates with a rotating irregularly shaped cam 52 on a shaft 54 of a small motor 56. This apparatus comprises the interrupter or chopper so that the small voltage may be amplified by alternately energizing the opposite halves of the primary through movement of switch arm 44 by cam movement. Resistor 58 has connected thereacross various voltages from a plurality of circuits, one circuit providing means for balancing the device initially and the second for determining the sensitivity thereof. The first, or balancing circuit, is composed of a battery 94, one side of which is connected through switch 96 and thence to terminal 100 of a double-pole, double-throw switch, the opposite side of the battery 94 being connected to a variable resistor 98 and the other side of which is connected to a terminal 102 of the above mentioned switch. The second circuit, or one determining the sensitivity of the device, is powered by a battery 60 which is connected by line 62 to terminal 92 of the double-pole, double-throw switch and also by a connecting line 64 to one terminal of the resistor 58. The opposite side of the battery 60 is connected by line 66 to a movable switch arm 68 which is adapted to contact a series of switch points 70, 72, 74 and 76, the point 70 being disconnected and being the dead point of the switch, 72, 74 and 76 each being connected respectively to resistors 78, 80 and 82 which are commonly connected through line 84 to switch point 90 and also by line 88 to the opposite terminal of the resistor 58. The terminals 90 and 92 are cross connected to terminals 91 and 93 of the double-pole, double-throw switch. In this manner, with the double-pole, double-throw switch and switch 96 closed and the switch 68 on its contact 70, the circuit may be balanced to a zero position on the meter by changing the value of the variable resistance 98. After this system has been balanced, the sensitivity thereof may be determined by moving the switch arm 68 to any one of its various points 72, 74 and 76 which connect into the system and across the resistor 58 various voltages depending upon the values of the resistors and thus an indication of the sensitivity of the system may be obtained.

The secondary 104 of the transformer T₁ is connected directly to an alternating current amplifier 106, the output of said amplifier being connected to primary 108 of a second transformer T₂, the secondary 110 of which has its center point connected by line 112 with a certain output 114 which may be any one of a number of different devices. The outer terminals of the secondary 110 are connected by lines 116 and 118 resp. to stationary contacts 120 and 122 which cooperate with a single movable contact 124 mounted on the end of a pivoted lever 126 which is pivoted about its center at 130. This pivoted lever is electrically connected by line 132 to the load 114. The opposite end of this pivoted lever is provided with a cam pin 134 which also cooperates with the rotating cam 52 formerly described.

In the operation of the device the motor 56 rotates continuously and it will be seen that in this event the cam 52 will cause both lever 46 and lever 126 to cause their movable contacts to oscillate between their fixed contacts and close the same in synchronism. As long as the amount of radiant energy focused on the thermopiles is the same, no indication will be obtained at the indicating means 114, which, it might be mentioned, may be a sensitive meter, a pair of telephone receivers, or perhaps a relay means to operate lights or a driving motor. However, as soon as more beams or rays fall on one thermocouple than the other, the circuit is unbalanced and current flows therein from the thermocouples 26, line 18, resistor 58, center tap of transformer $T_1$ (assuming that pivoted lever 46 is in its upper position), the lower half of the transformer primary 34, line 38, contact 42, 44, arm 46 and line 20.

Current flow will only be of short duration due to the fact that this circuit is broken within the next 90° of rotation of the motor shaft 56, but at the following instant is made on the lower contact 40 and therefore the upper half of the transformer primary 34 is energized. This interruption of course continues and this causes an induced current to flow in the secondary of the transformer $T_1$ which alternating current is applied to a conventional alternating current amplifier which in this instance is of the vacuum tube type of a sufficient number of stages to bring the current up to a useable value. The output of said amplifier is then applied to the transformer of primary $T_2$, the secondary of which is split into two halves, the circuits of which are alternately closed in exactly the same order as the split primary in the transformer $T_1$ and in this manner the current is reconverted into direct current of the same polarity as the detector circuit which may be utilized by any suitable means desired such as suggested above.

In order to properly set the circuit the switch arm 68 is set on the desired tap and the double-pole, double-throw switch is adjusted to apply the balancing current of battery 94 through adjustment of the variable resistor 98 with switch 96 closed before the device is put into operation which adjustment will set an indicating device as a meter when placed at 114 to read on the proper scale and in the proper amount.

It is thus obvious that we have devised means for amplifying minute direct currents; that these are initially converted into alternating currents so that they may be better amplified and after such amplification are reconverted into direct current for the operation of any type of indicating means desired and that this conversion and reconversion from and to direct current is accomplished by a single rotary source which may be termed a "chopper," said common rotary source both causing the D. C. to be chopped up in the primary and then rectified in the secondary in synchronism and with the same polarity.

One of the uses to which the amplified current flowing in lines 112 and 132 may be used might be to actuate relay means operating to close switches depending upon the direction of the flow of the current to energize motive means for follow-up or scanning purposes.

It is possible of course to provide a chopper or interrupter of a different form to accomplish the same result and one modification thereof is shown in Figure 2 wherein it is assumed that both of the cams are mounted on a common shaft 54 driven by the same motor 56 and as shown the thermocouple 26 has one terminal connected to line 116 which terminates in contact 118 and a second terminal connected by line 120 to a stationary contact 122. The same terminals are connected by line 124 to stationary contact 126 and by line 128 to stationary contact 130 of a second switch. Cooperating with the first two stationary contacts are two pivoted levers 132 and 134 respectively which are spring biased toward each other and toward a cam 136 which controls their position. The second set of stationary contacts 130 and 126 cooperate with the similar pair of pivoted levers 138 and 140 which are also spring biased inwardly toward each other and toward their operating cam 142. The first set of pivoted levers 132 and 134 are connected by lines 144 and 146 to the opposite ends of the primary 148 of a transformer $T_3$ and the second pair of pivoted levers 138 and 140 are likewise connected to the same ends by lines 150 and 152.

The secondary 154 of the transformer $T_3$ is connected to the input of the amplifier 106, the output of which is connected by lines 156 and 158 to pivoted levers 160 and 162 respectively which carry on their outer or movable ends contacts 164 and 166 which oscillate between stationary contacts 168, 170, 172 and 174 respectively. Contacts 168 and 172 are connected to the same output line 176 and stationary contacts 174 and 170 are connected to output line 178. The output of course may go as previously described to any suitable indicating or operating mechanism.

It is thus evident that if the cams 136, 142 and 180 are all mounted on the same shaft so that they rotate in synchronism, in the primary circuit or winding 148 the terminals of the thermopile are alternately connected to opposite terminals of said winding through the medium of the two switches, that is, every 90° of rotation of the shaft 54 the upper pivoted levers 132 and 134 will close upon contacts 118 and 122 and at each 45° of rotation intermediate these steps the lower contact levers 138 and 140 will close contacts 126 and 130. Thus every 45° of angular rotation of shaft 54 a connection will be made through the primary 148 and each alternate connection will apply voltage in the reverse direction to supply alternating current. This will of course induce an alternating current in the secondary winding 154 which as before will be applied to the amplifier 106 for necessary amplification. The output of said amplifier is applied across a similar switch in which lines 156 and 158 are alternately connected to output lines 176 and 178 so that a continuous or direct current flows therethrough. This particular modification while it accomplishes the same result broadly, has the advantage that it balances out contact and thermal E. M. F.'s at the switch points which might otherwise occur due to the movable contacts being of slightly different material from the stationary contacts.

Referring now to Figure 3 a further modification of our circuit is shown and in this instance the thermopile 26 is connected by line 182 to one terminal of a battery 184 and to one end of resistor 186. The opposite terminal of the battery is connected by line 185 to the other end of the variable resistor 186, the movable or variable contact 188 of which is connected by line 190 to the center tap of primary 192 of transformer T4. The outer terminals of the primary 192 are connected by lines 194 and 196 to stationary contacts 198 and 200 respectively. Oscillating between these two stationary contacts is a pivoted lever 202 carrying on its outer end contact 204 which is spring biased toward a rotating cam 206 and is connected to line 183 which in turn is connected to the opposite terminal of the thermopile.

The secondary 208 of the transformer T4 is connected to the input of the A. C. amplifier 106 and the output of the same is connected by lines 210 and 212 to a pair of pivoted levers 214 and 216 whose oscillating contacts 218 and 220 are each vibrated between two fixed contacts 222, 224 and 226, 228 respectively. Of these stationary contacts 224 and 228 are connected to the same output line 230 and contact 222 and 226 are connected to output line 232. The pivoted levers 214 and 216 are in this instance moved by a rotatable cam 234. In this instance current flowing in the primary circuit due to the thermocouple is augmented by a portion of the voltage of battery 184 to balance out spurious E. M. F.'s, the proportion of the voltage being adjustable by the variable potentiometer 186, 188 and this voltage is applied alternately to the halves of the primary 192 by the oscillating switch arm 204. Thus when this arm contacts 200, the upper half of the primary is energized and when it contacts 198 the lower half of the primary is energized. Thus the direct current is transformed into alternating current which can be amplified and which is then reconverted into direct current by the oscillating switch composed of the cam 234 which is as before driven by the same shaft as cam 206 and the movable arms 214 and 216.

It is thus evident that we have provided herein a very sensitive amplifier for small amounts of direct current flow which in turn is transformed into alternating current so that the same may be more easily and satisfactorily amplified which is again reconverted into direct current for the operation of indicating, recording or operating means and that the interrupting and rectifying means is synchronized, phased and polarized to give the same direct current polarities in the input circuit and in the indicating or load circuit. These results may be read upon a meter, caused to operate a control motor to maintain the scope pointed toward an object, or may be used to give audible sounds if applied to telephone receivers, and thus in any of these ways indicate the presence of a body emanating radiant heat rays.

We claim:

1. In means for amplifying small voltages, a source of current, an amplifier having input and output circuits, said input circuit being connected to said source and said output circuit to predetermined apparatus, transformer means connected in the input circuit having a center tapped primary, stationary contacts connected to the outside primary leads, said center tap being connected directly to said source, a pivotal contact reciprocable between the stationary contacts and connected to said source, a double pair of stationary contacts in the output circuit, two pivotally movable contact members cooperating with said stationary contacts, said pivotally movable members being directly connected to said amplifier, said stationary contacts being inversely connected in pairs to the output line and common driving means for all of the pivotal members.

2. In means for amplifying small voltages, a source of current, an amplifier having input and output circuits, said input circuit being connected to said source and said output circuit to predetermined apparatus, a pair of oppositely phased interrupters connected in the input circuit in inverse relation, a double pair of stationary contacts in the output circuit, two pivotally movable contact members cooperating with said stationary contacts, said pivotally movable members being directly connected to said amplifier, said stationary contacts being inversely connected to the output line and common driving means for all of the pivotal and interrupter members.

3. In means for amplifying small voltages, a source of current, an amplifier having in-put and out-put circuits, said in-put circuit being connected to said source and said out-put circuit to predetermined apparatus, transformer means connected in the in-put circuit, interrupter means connected between the source of current and the transformer means including stationary and co-operating reciprocating contacts, a double pair of stationary contacts in the out-put circuit, two pivotally movable contact members cooperating with said stationary contacts, said pivotally movable members being directly connected to said amplifier, said stationary contacts being inversely connected in pairs to the out-put line and common driving means for all of the pivotal and interrupter means.

WALTER E. SARGEANT.
HERMAN BENNER HOEPER.